United States Patent [19]

Pullela et al.

[11] Patent Number: 6,074,429
[45] Date of Patent: *Jun. 13, 2000

[54] OPTIMIZING COMBINATIONAL CIRCUIT LAYOUT THROUGH ITERATIVE RESTRUCTURING

[75] Inventors: Satyamurthy Pullela; Stephen C. Moore; David Blaauw; Rajendran Panda; Gopalakrishnan Vijayan, all of Austin, Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/805,865

[22] Filed: Mar. 3, 1997

[51] Int. Cl.⁷ .................................................. G06F 17/50
[52] U.S. Cl. .................................. 716/6; 703/19; 703/14
[58] Field of Search ...................... 364/488, 489, 364/490, 491; 395/500.07, 500.4, 500.35, 500.36, 500.34

[56] References Cited

U.S. PATENT DOCUMENTS

| | | | |
|---|---|---|---|
| 4,484,292 | 11/1984 | Hong et al. | 395/900.14 |
| 4,495,559 | 1/1985 | Gelatt, Jr. et al. | 700/28 |
| 4,533,993 | 8/1985 | McCanny et al. | 712/16 |
| 4,543,646 | 9/1985 | Ambrosius, III et al. | 380/29 |
| 4,639,857 | 1/1987 | McCanny et al. | 708/620 |
| 4,827,428 | 5/1989 | Dunlop | 364/491 |
| 5,095,454 | 3/1992 | Huang | 364/578 |
| 5,218,551 | 6/1993 | Agrawal et al. | 395/500.11 |
| 5,408,663 | 4/1995 | Miller et al. | 709/104 |
| 5,426,591 | 6/1995 | Ginetti et al. | 395/500.07 |
| 5,508,937 | 4/1996 | Abato et al. | 395/500.07 |
| 5,521,837 | 5/1996 | Frankle et al. | 395/500.11 |
| 5,553,000 | 9/1996 | Dey et al. | 395/500.07 |
| 5,619,418 | 4/1997 | Blauuw | 364/489 |
| 5,654,898 | 8/1997 | Roetcisoender et al. | 364/490 |
| 5,666,288 | 9/1997 | Jones et al. | 364/490 |
| 5,751,593 | 5/1998 | Pullela et al. | 395/500.07 |
| 5,787,008 | 7/1998 | Pullela et al. | 395/500.4 |
| 5,790,415 | 8/1998 | Pullela et al. | 395/500.07 |
| 5,903,471 | 5/1999 | Pullela et al. | 395/500.07 |

OTHER PUBLICATIONS

US Patent Application, Satyamurthy, et al., "Simulation corrected sensitivity," Serial No. 08/429,488, filed Apr. 10, 1996.

US Patent Application, Blaauw, et al., "Element Sizing for Integrated Circuits," Serial No. 08/495,061, filed Jun. 26, 1995.

US Patent Application, Blaauw et al., "A Logic Gate Size Optimization Process for an Inegrated Circuit Whereby Circuit Speed is Improved While Circuit Area is Optimized," Serial No. 08/390,210, filed Feb. 16, 1995.

Lin, et al., "Cell Height Driven Transistor Sizing in a Cell Based Model Design", IEEE, pp. 425–429, 1994.

Lee, et al., "A New Approach to Optimal Transistor Sizing in CMOS Digital Designs", IEEE, pp. 415–418, Jun. 1991.

Matson, "Optimization of Digital MOS VLSI Circuits", Chapel Hill Conference on Very Large Scale Integration, pp. 109–126, 1985.

(List continued on next page.)

*Primary Examiner*—Kevin J. Teska
*Assistant Examiner*—Vuthe Siek

[57] ABSTRACT

Speed, size, and power trade-offs of a VLSI combinational circuit are optimized through iterative restructuring. First, timing analysis for the circuit is performed (102) to find the critical path through the circuit (104). Then, a gate is selected from the critical path (106), and a window is contracted around the gate (108). Within the window, alternate structures are constructed (110) and sized (112). The best alternative is substituted into the window (114), and the new circuit is resized (116). If the new circuit is not an improvement over the old (118), then the original window is replaced (120). In any case, this is repeated for each gate in the circuit (124). The entire process is then repeated until either user constraints are met, or the circuit doesn't change (122).

15 Claims, 5 Drawing Sheets

OTHER PUBLICATIONS

Jouppi, "Timing Analysis for nMos VLSI", IEEE 20th Design Automation Conference, Paper 27.3, pp. 411–418, 1983.

US Patent Application, Edwards, et al. "Power Optimization for Integrated Circuits," Serial No. 08/521,493, filed Aug. 30, 1995.

US Patent Application, Dharchoudhury, et al., "Fast Semi–Analytical Timing Simulation of MOS Circuits," Serial No. 08/629,489, filed on Apr. 10, 1996.

OPTIMIZING COMBINATIONAL CIRCUIT LAYOUT THROUGH ITERATIVE RESTRUCTURING

REFERENCE TO RELATED APPLICATIONS

The present application is related to the following U.S. patent application:

"Element Sizing For Integrated Circuits", invented by David T. Blaauw et al., having U.S. patent application Ser. No. 08/495,061, filed Jun. 26, 1995, and assigned to the assignee hereof.

FIELD OF THE INVENTION

The present invention relates generally to integrated circuit design and more particularly to the design and manufacture of Very Large Scale Integration (VLSI) integrated circuits that are optimized with regard to certain design criteria.

BACKGROUND OF THE INVENTION

With the continuing and increasing demand for electronic devices of all kinds, there is a concurrent need to improve the quality and reduce the manufacturing time of these devices. In general, all electronic devices include at least one integrated circuit ("IC") or "chip" which integrates millions of transistors and connections on one tiny substrate of semiconductor material. The miniaturization of integrated circuits, and the products which they control, continues to be of major significance in the marketplace and a driving force to the manufacturers of such products.

In designing integrated circuits, there are several key criteria which need to be optimized with respect to each other in order to create a design and an on-chip layout for an integrated circuit which provides the best overall results within certain cost and other design constraints. Such criteria include the size of the chip, power consumption of the chip, and the speed of operation for the various functions accomplished within the chip. This kind of optimization analysis is normally done on a workstation or other computer system running various analysis and design programs which, in turn, operate to weigh the relative significance of the various design criteria for each specific application in which the designed integrated circuit will be implemented.

One of the most important of these design criteria is the time delay involved in a particular design for a digital signal to travel through a particular path or paths on the integrated circuit to get to certain key points or nodes of the circuit in the minimum time possible consistent with performance requirements. Ideally, the best design of an integrated circuit is the design that enables a signal to traverse a predetermined layout between certain key points in the smallest amount of time, wherein the layout or integrated circuit consumes minimal power and requires the smallest amount of semiconductor area to implement. In most cases, these criteria are mutually conflicting so that one cannot be improved without decreasing the efficacy of another at least to some extent.

For example, in the "sizing" of particular transistors for a proposed integrated circuit design, it is noted that although increasing the area of the transistors in the design will, in general, decrease the time delay in signal transmission, it will also increase the size and power consumption of the chip, and therefore limit the applicability of the chip in certain product areas, as well as reduce the profitability of the chip. Also, a decrease in the size of a chip will, in general, decrease its power consumption, heat generation, and chip signal interference. The priority of each of the above design constraints, and others, and the best possible solution for a particular application, will depend upon the application in which the integrated circuit is to be used. In most cases, the best result is obtained through a combination of trade-offs which are optimized with specific regard to, and consideration of, the specific application for the integrated circuit being designed.

Similarly, a trade-off can be had between different structures of the circuit such as combining gates into one gate, or splitting up one gate into multiple gates. By performing such changes in structure, a trade-off can be had between the power consumption, the performance, and the area of the implementation of the overall circuit.

In order to determine the level of optimization and evaluate the effectiveness of any particular design, certain analyses have been used in the industry. One such general evaluation technique is timing analysis which is intended to estimate the time delay of a signal through a digital circuit as described above. In the past, many such timing approaches have been used by circuit designers in order to optimize the efficacy or "strength" or size of a new combination of criteria values for a new integrated circuit design. One such approach adopted by some in the past is the method by which first, a timing analysis is made for a circuit, then a "critical path" or "speed path" is identified and only the components or elements on that critical path are analyzed for possible sizing optimization.

While this approach is generally satisfactory, there is a need for improvement that not only sizes the circuit but also optimizes the structure of the integrated circuit (IC) design.

In addition to the optimization of signal transition speed and silicon area for integrated circuits being designed, there is also a continuing need to optimize the design process itself which provides the optimized netlist, such that the desired circuit netlist and circuit optimizations can be accurately obtained more quickly and efficiently during the chip design process. That requirement can also be met through the implementation of the approaches and methods hereinafter disclosed.

BRIEF DESCRIPTION OF THE DRAWINGS

A better understanding of the present invention can be obtained when the following detailed description is considered in conjunction with the following drawings, in which.

DETAILED DESCRIPTION

The present disclosure provides improved methods and techniques for use in oprimizing circuits, gates and other elements implemented in the design of integrated circuits.

Figure 1:
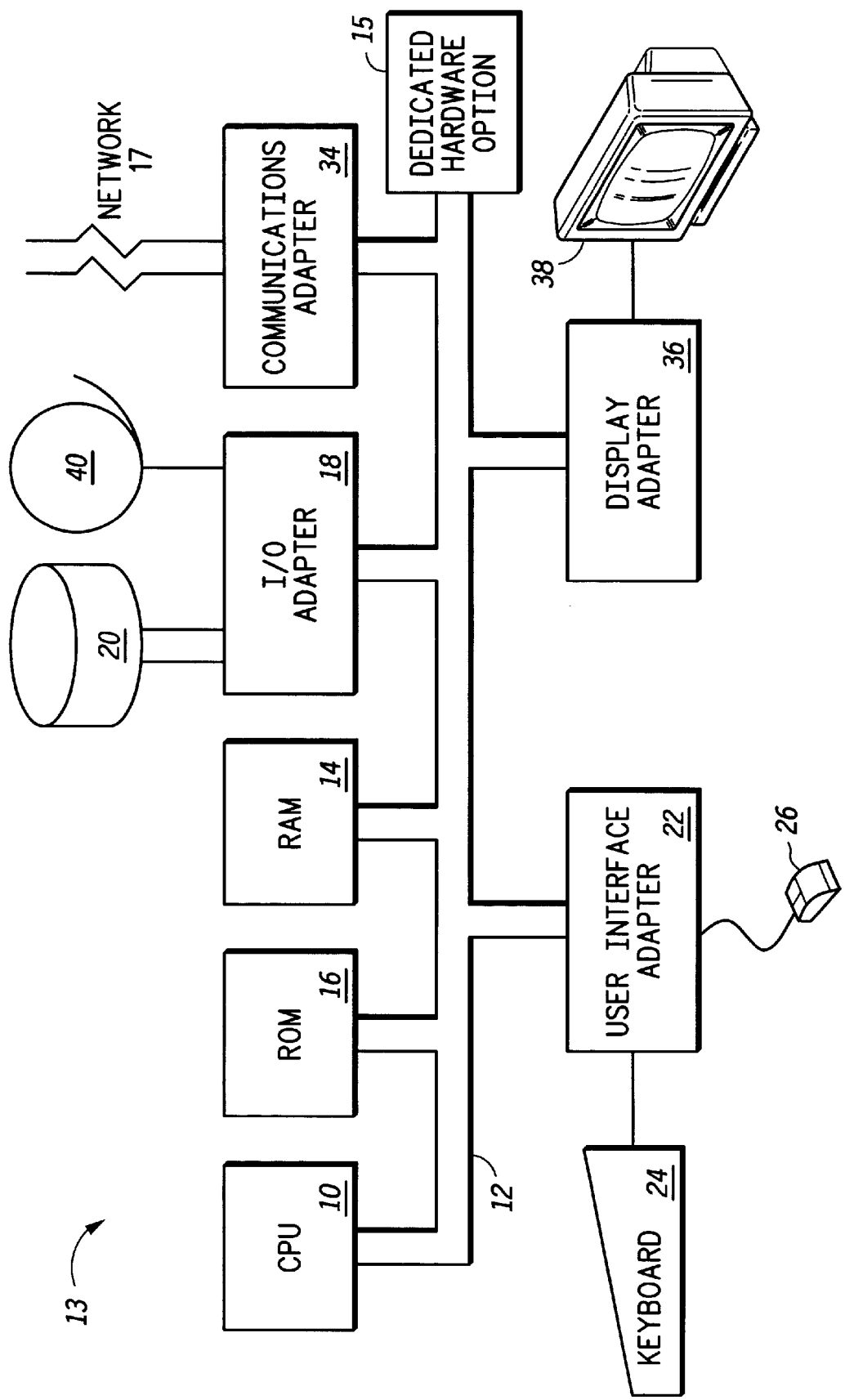
FIG. 1 is a block diagram of a system within which the various disclosed methodologies may be implemented and practiced.

As illustrated in FIG. 1, the various methods discussed above may be implemented within dedicated hardware 15, or within processes implemented within a data processing system 13. A typical hardware configuration of a workstation which may be implemented to accomplish the methodologies disclosed herein, is illustrated and includes a central processing unit (CPU) 10, such as a conventional microprocessor, and a number of other units interconnected via system bus 12. The workstation shown in FIG. 1 includes random access memory (RAM) 14, read-only memory (ROM) 16, and input/output (I/O) adapter 18 for connecting peripheral devices, such as disk units 20 and tape units 40, to bus 12. A user interface adapter 22 is used to connect a keyboard device 24 and a mouse 26 to the system bus 12. Other user interface devices such as a touch screen device (not shown) may also be coupled to the system bus 12 through the user interface adapter 22.

A communication adapter 34 is also shown for connecting the workstation to a data processing network 17. Further, a display adapter 36 connects the system bus 12 to a display device 38. The method of the present invention may be implemented and stored on computer readable media such as one or more of the disk units 20, tape drives 40, ROM 16 and/or RAM 14, or even made available to system 13 via a network connection through communications adapter 34 and thereafter processed by CPU 10. Since the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Figure 2:
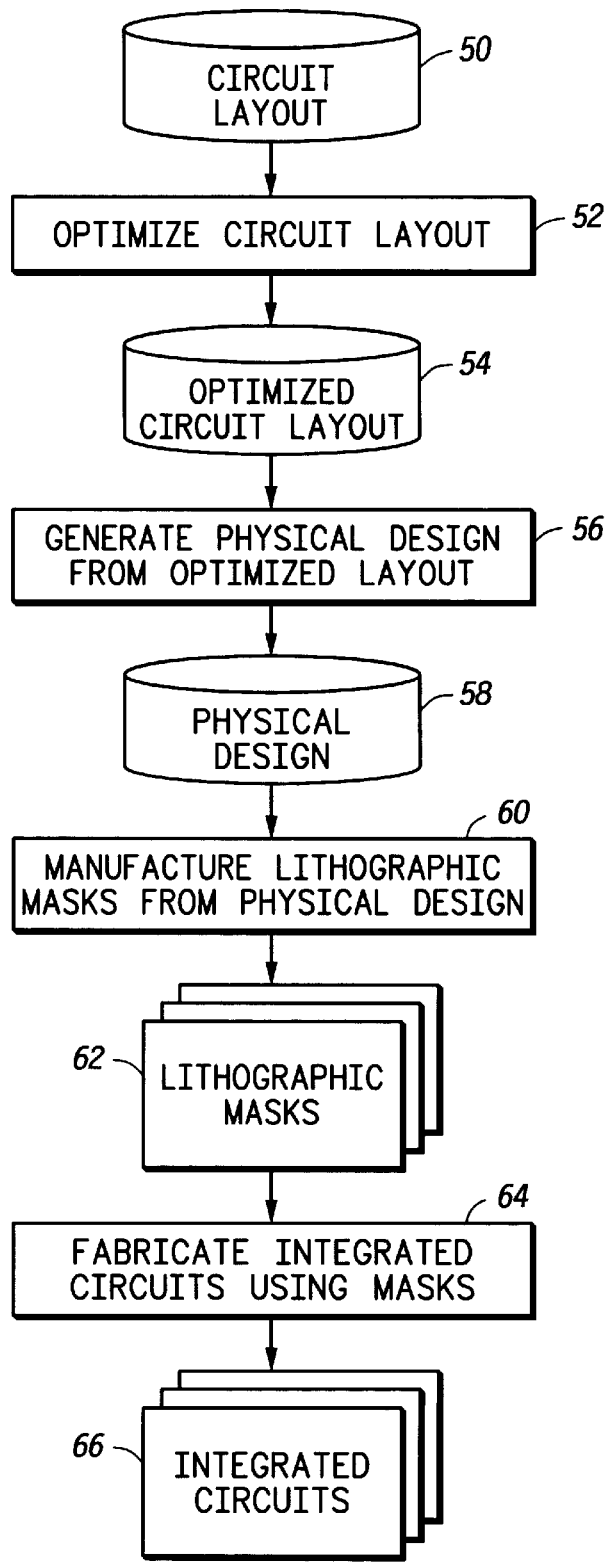
FIG. 2 is a block diagram that illustrates integrated circuit fabrication, in accordance with the present invention.
Figure 4:
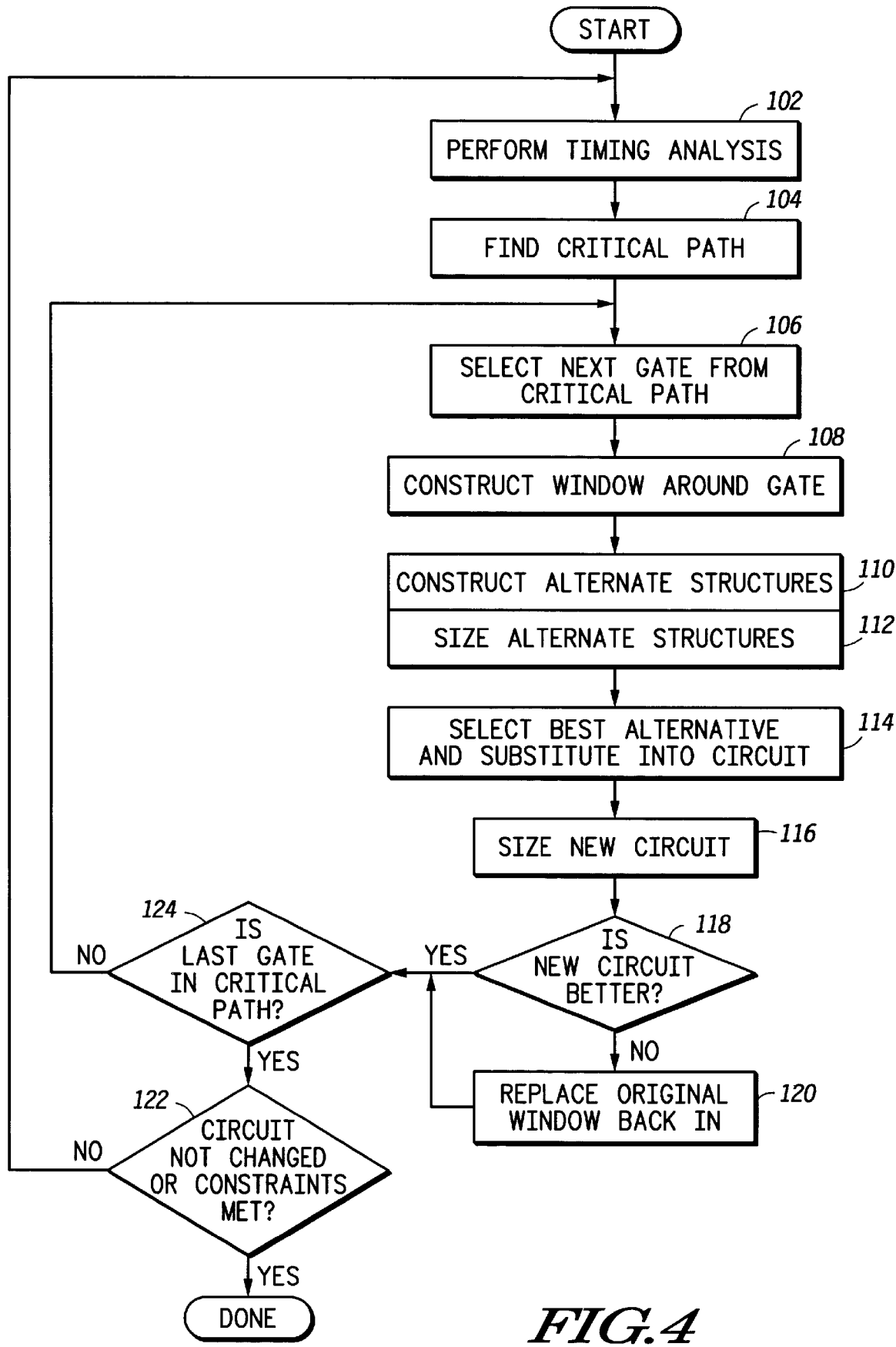
FIG. 4 is a flow chart illustrating a method of improving performance of a circuit while minimizing the increase in area and power, in accordance with the present invention.

FIG. 2 is a block diagram that illustrates integrated circuit fabrication utilizing the optimized cell layout tool 52 disclosed in FIG. 4. The optimized cell layout tool 52 utilizes a circuit layout 50 to generate an optimized circuit layout 54. A physical design file 58 is generated 56 from the optimized circuit layout 54. The circuit layout 50, optimized circuit layout 54, and physical design 58 are typically stored as data files on computer readable media such as disk units 20. The physical design file 58 includes integrated circuit dimensions, element dimensions, and element locations within the integrated circuit. The physical design file 58 locates elements and connections within a two-dimensional substrate area of an integrated circuit die. Preferably, the physical design file 58 includes physical structure for performing the functions of an integrated circuit design from which the physical design file 58 was derived. The physical design 58 is converted 60 into a set of lithographic masks 62 corresponding to the layers in the physical design file 58. The lithographic masks 62 are used to fabricate 64 integrated circuits 66.

The methods taught herein are used to generate CAD (computer aided design) data files which contain information regarding an integrated circuit and placement of gates, transistors, and the like in the integrated circuit. These files are then used to form lithographic masks which are then used to form a plurality of integrated circuits on a plurality of wafers using an integrated circuit fabrication facility. The design phase is taught in "Principles of CMOS VLSI Design: A Systems Perspective", by N. H. E. Weste and K. Eshragian in the VLSI Series by Addison-Wesley, 1985. Fabrication techniques are outlined in "Silicon Processing for the VLSI Era, Volume 1: Process Technology", by Wolf and Tauber, copyright 1986, published by Lattice Press.

Process integration is taught by the second book in the series: "Silicon Processing for the VLSI Era, Volume 2: Process Integration", by Wolf, copyright 1990, published by Lattice Press.

In general, it is noted that the integrated circuits being designed for element sizing are comprised of a plurality of elements (sometimes millions of elements) including transistors and logic gates. Each such transistor or gate has an inherent signal propagation delay time associated with it, and that delay is typically measured in nanoseconds or picoseconds. Timing constraints within integrated circuits are usually specified in nanoseconds and represent the maximum allowed propagation time of a signal between two different points in an integrated circuit. Such timing constraints must be met in order for the integrated circuit to meet an overall specification relative to the speed with which signal processing must occur to provide a competitive product in the market place or to be compatible with other integrated circuits in a larger system.

The speed of an integrated circuit is proportional to its size and its strength or merit. For example, the size and strength of a transistor is directly related to the width of a transistor gate for transistor elements and the number of transistor elements and/or the number of gates.

In a prior art method of integrated circuit element sizing, an integrated chip design was first analyzed to identify the "critical path" of the circuit. The critical path of an integrated circuit includes elements which, when increased in size, will contribute directly to an improvement in overall circuit speed. In all integrated circuits there are elements that are not on a so-called critical path because an increase in the size of the off-critical-path element, although it may decrease the propagation delay of that element, will not impact the overall speed of the integrated circuit since a downstream gate will have to wait for a later generating signal in any event. The critical path refers to the path of elements which generate those later occurring signals and are therefore critical to the overall speed of the chip.

In the past, a timing analysis was first accomplished and then the critical path of the integrated circuit design was determined. Next, the critical path timing was analyzed to determine the "arrival times" for signals at various critical path nodes within the circuit. Next, it was determined whether the critical path time is less than that necessary to -comply with a user constraint. If the critical path time was less than the user constraint specification, then, in accordance with this prior method, the overall circuit speed objective of the Integrated Circuit (IC) design had been met and the "sizing" job had been completed. If, however, the critical path time exceeded the user specification, further processing was required to modify the design to meet the specification. The speed or timing effect of an increase in size for each element on the critical path in the circuit was then calculated. Next, the element in the critical path that had the greatest impact on the timing of the circuit per unit size increase was determined and that element was selected to be modified. The circuit design with that modified element was again analyzed and the method was repeated until the critical path time was determined to be less than the user constraint timing. At that point, the design process was considered completed.

With this prior art method only the sizes of the elements of the circuit were changed while the topology and structure of the circuit and sub-circuits remained the same. However, further improvement in the quality of the circuit can be had by not only changing the size but also the structure of the circuit according to the herein disclosed method.

Figure 3:
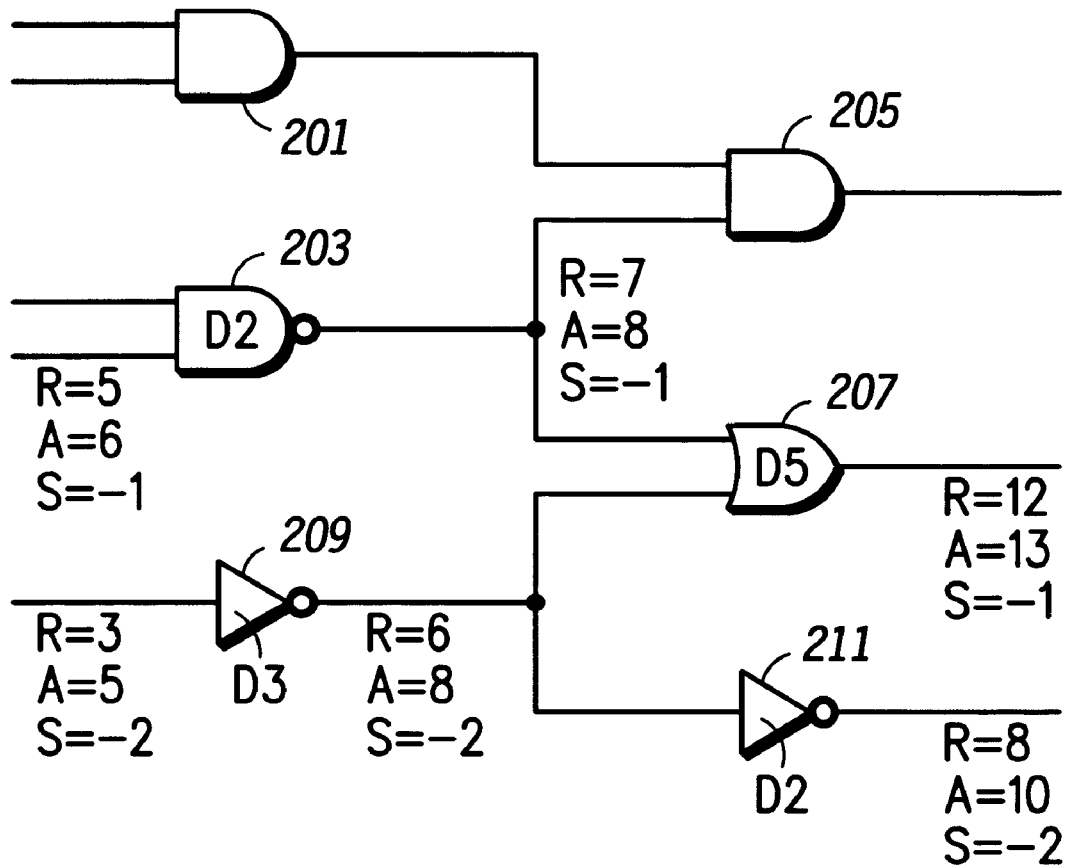
FIG. 3 is an exemplary circuit useful in explaining the method of structural optimization.

To better illustrate the overall processing of an element size determination, reference should be had to FIG. 3. In FIG. 3, an exemplary portion of an integrated circuit is shown in which signals are received by gates 201 and 203 and provide output signals which are in turn applied to additional gates 205 and 207. An inverter circuit 209 also receives an input signal and applies output signals therefrom to gate 207 and another inverter 211. Each gate in the circuit shown includes an inherent signal propagation delay time. For example, gate 209 has a delay time of 3 nanoseconds (ns), which is indicated by the "D3" notation. Similarly, gates 203 and 207 have delays of 2 ns and 5 ns, respectively, associated therewith. Also inverters 209 and 211 have delays of 3 ns and 2 ns, respectively, associated with those elements.

In the illustration, the "worst case" arrival times are calculated for all outputs of the devices in the chip. The worst case arrival time is the latest time a signal could arrive at a particular node within the circuit. In FIG. 3, as an example, the arrival times "A" is 6 ns for the lower input to AND gate 203. Similarly, inverter 209 has a signal arrival time of 5 nanoseconds, and after incurring the inherent inverter 209 delay of 3 nanoseconds, emerges at the output node of the inverter 209 with an arrival time at that point of 8 nanoseconds. The times shown are arbitrary and exemplary and are selected to show the relative arrival and delay times associated with an exemplary integrated circuit portion.

Also shown in FIG. 3, are the relative "required" or user constrained times "R", at the same nodes which must be met in order to meet overall system design requirements. AND gate 203 has a required time "R" of 5 nanoseconds for example. Similarly, inverter 209 has an input R time of 3 nanoseconds, and an output R time (after adding the device delay of 3 nanoseconds) of 6 nanoseconds. Gate 207 has an output R time of 12 ns and inverter 211 has an output R of 8 ns.

FIG. 4 is a flow chart illustrating a method of improving performance of a circuit while minimizing the increase in area and power. It starts by performing timing analysis, step 102. The timing analysis calculates the last arrival times of each node and the earliest required times at each node as earlier illustrated in FIG. 3. The result of the timing analysis is then examined to determine the critical path in the circuit, step 104. The "critical path" is the path of elements which generate late occurring signals and are there for critical to the overall speed of the chip.

Following timing analysis, every gate is sequentially examined along the critical path starting with the first gate from the critical path, step 106. Typically, the gates along the critical path are selected in a backwards fashion staring with the gate closest to the output and moving to the gate closest to the input. However, other methods such as starting with the gate at the input moving to the output can also be applied.

Next, in step 108, a window of gate is constructed corresponding to each gate selected in step 106. A window is constructed such that the gate selected from step 106 is at the center of the window and gates immediately connecting to this gate are included in the constructed window until a maximum number of gates or transistors has been exceeded. Typically, the gates in the window include gates both connected to the inputs of the selected gate, as well as gates connected to the outputs of the selected gate.

In step 110, alternate structures are generated for each window that was generated in step 108. For each window generated in step 108, multiple alternatives can be generated, each with a different structure by combining multiple gates into one gate, splitting large gates into subgates, or restructuring the internal structure of each gate. Since the performance and area of a structure is highly dependent on the transistor sizes of the structure, the alternate structures constructed in step 110 are sized in step 112.

Each of the alternate structures constructed in step 110 and sized in step 112 is compared based on a merit function, step 114. The merit function can include criteria such as the performance of the alternate structure in terms of circuit delay, as well as its area in terms of circuit transistor area or number of transistors. In the application of this method for performance optimization, typically the circuit delay of the alternate circuit is used as a merit function to perform the evaluation. After calculating the merit function for each alternate circuit structure this step 114 then selects the alternate circuit structure with the greatest merit using the merit function and substitutes this structure into the overall circuit in place of the original window. Then, the entire circuit is resized in order to evaluate the performance of the overall circuit with the new alternate circuit structure present, step 116. Sizing can be performed by methods such as explained in "Element sizing for integrated circuits", invented by David T. Blaauw, et al., U.S. patent application Ser. No. 08/495,061, filed Jun. 26, 1995, and assigned to the assignee hereof.

After resizing the circuit in step 116, the overall performance and merit of the circuit can be evaluated, step 118. This is done since the overall circuit may or may not perform better with the new window substituted, even though the alternate window that was substituted may independently provide a better circuit performance. Note that although the circuit can be sized to various types of area criteria, typically the circuit with the new alternate structure inserted is resized to match the same area as the original circuit with the original window.

If in step 118, it is determined that a new circuit with a new circuit window in place performs worse according to the merit function specified by the user, then the old original circuit window is replaced back into the circuit in place of the new circuit window, step 120. If however in step 118 it is determined that the new circuit window performs better according to the specified merit function than the old original circuit window, then the new circuit window is left in place in the circuit. In either case, it is determined whether this is the last gate in the critical path, step 124. If this is not the last gate in the critical path, step 124, then the procedure is repeated starting again at step 106.

If however this is the last gate of the critical path, step 124, then a test is made in step 122 whether any circuit changes were made in the previous steps 106–120, or whether the constraints specified by the user are met. If the constraints specified by the user are met, or if no changes were made in the previous iteration through steps 106–120, then the circuit is completed, and the method is terminated. Otherwise the overall method is repeated again starting at step 102.

The methods and implementing apparatus of the present invention has been described in connection with the preferred embodiments as disclosed herein. Although exemplary embodiments of the present invention have been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Figure 5:
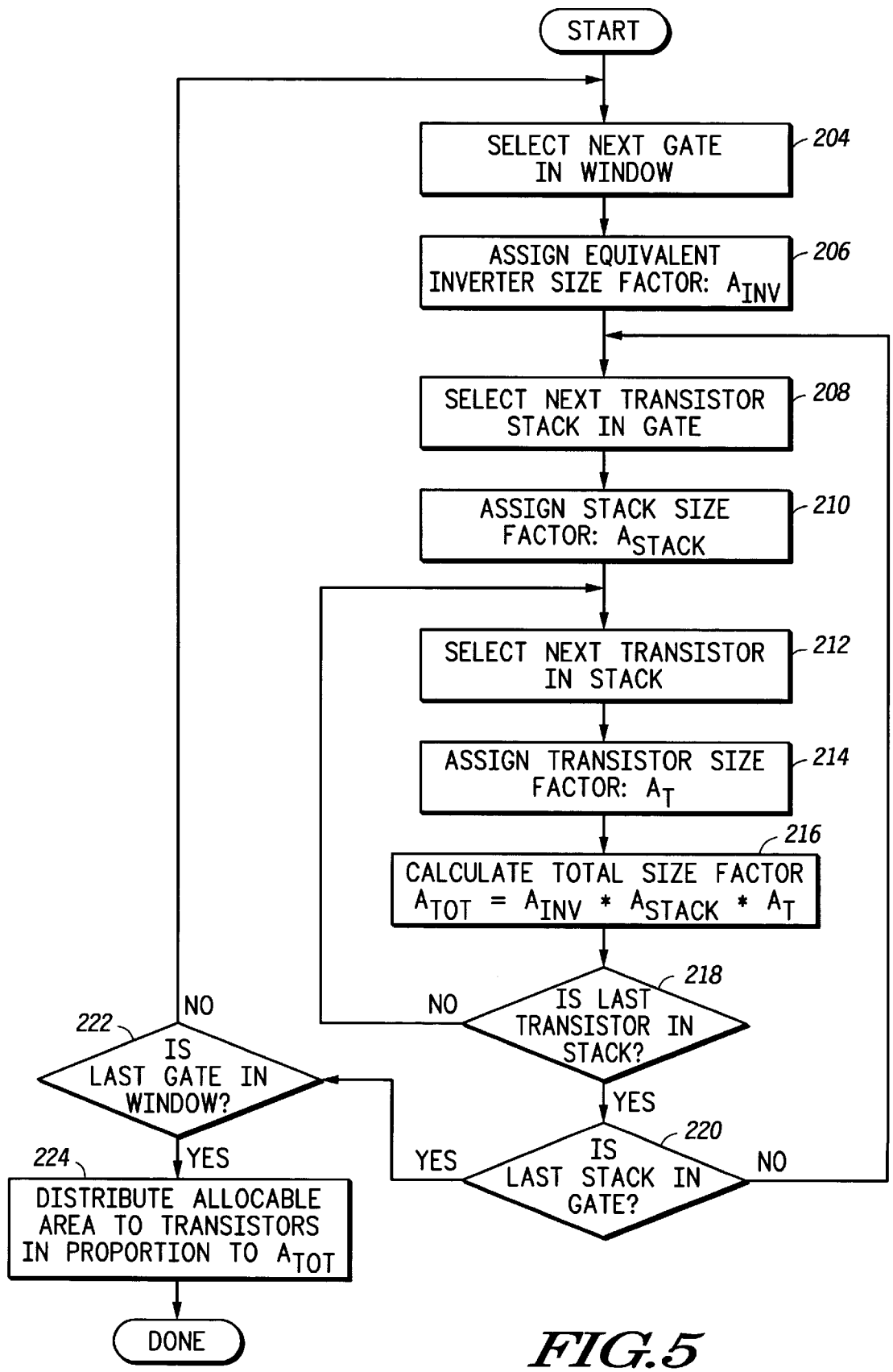
FIG. 5 is a flow chart illustrating a method of quickly sizing alternate circuit structures as shown in step 112 of FIG. 4 for the purpose of comparing merit between alternate circuit structures.

FIG. 5 is a flow chart illustrating a method of quickly sizing alternate circuit structures as shown in step 112 of FIG. 3 for the purpose of comparing merit between alternate circuit structures.

The method begins by selecting the next gate in a window, step 204. Preferably, gates are selected in order from output of a window to input of the window. This step is illustrated in the context of a window as constructed in step 108 of FIG. 4. However this method is also applicable in general to a circuit structure.

The gates selected in step 204 are assigned an equivalent inverter size factor $A_{INV}$ which relates the size of an equivalent inverter in the same position in the inverter chain to the size of the window, step 206. The method then proceeds in step 208 to select the next transistor stack in the gate that was selected in step 204. Then in step 210 a stack size is assigned a factor $A_{STACK}$ to the stack that was selected in step 208. This relates the size of the stack to the size of the equivalent inverter. The next transistor in the stack selected in step 208 is selected in step 212. A transistor size factor is assigned to the transistor $A_T$ which relates the size of the transistor to the size of the stack, step 214. Next, a total size factor ($A_{TOT}$) for the transistor which was selected in step 212 $A_{TOT}=A_{INV}$ (assigned in step 206)$\times A_{STACK}$ (assigned in step 210)$\times A_T$ (assigned in step 214) is calculated, step 216.

A test is then made whether this is the last transistor in the stack, step 218. If this is not the last transistor in the stack, step 218, then steps 212, 214 and 216 are repeated. If this is the last transistor in the stack, a test is made whether this is the last stack in the gate, step 220. If it is not the last stack in the gate, then steps 208–220 are repeated. If it is the last stack in the gate then a test is made whether this is the last gate in the window, step 222. If not the last gate in the window, then steps 204–222 are repeated. Otherwise, if this is the last gate in the window, the area to transistors is distributed in proportion to the total transistor size factor $A_{TOT}$, step 224. The applicable area is a predetermined value that dictates the total transistor area that is to be assigned to the window during sizing. In the context of FIG. 4, the applicable area is determined to be the same as the transistor area of the original window constructed in step 108. Finally, the method is completed after the area distribution in step 224.

The values used for the size factors $A_{INV}$, $A_{STACK}$, $A_T$ can be determined for example through a precalibration table look-up interpolation. Using such a method, one would take a collection of sample circuits in various sizes, and varying gate types, and size the circuits using standard iterative sizing methods such as the one in step 116, FIG. 4. From each of these sample circuits, for each gate, and for each stack in the gate, and for each transistor in the stack, measurements can be taken which relate gate size to total circuit size, stack size to gate size, and transistor size to stack size. These measurements are stored in the precalibration table for rapid access.

Those skilled in the art will recognize that modifications and variations can be made without departing from the spirit of the invention. Therefore, it is intended that this invention encompass all such variations and modifications as fall within the scope of the appended claims.

claim elements and steps herein have been numbered and/or lettered solely as an aid in readability and understanding. As such, the numbering and/or lettering in itself is not intended to and should not be taken to indicate the ordering of elements and/or steps in the claims.

We claim:

1. A method of providing a circuit structure contained in a circuit layout, said method comprising:

a) selecting a gate from an original circuit as a selected gate;

b) constructing a window around the selected gate as an original window;

c) constructing a set of alternate structures for the original window;

d) forming a new window;

e) substituting the new window for the original window to form a new circuit; and f) sizing the new circuit by:
1) selecting a next gate from the new circuit as a selected gate;
2) assigning an equivalent inverter size factor ($A_{inv}$) to the selected gate;
3) selecting a next transistor stack in the selected gate as a selected stack;
4) assigning a stack size factor ($A_{stack}$) to the selected stack;
5) selecting a next transistor in the selected stack as a selected transistor;
6) assigning a transistor size factor ($A_t$) to the selected transistor;
7) calculating a total size factor $A_{tot}=A_{inv}*A_{stack}*A_t$;
8) repeating substeps (5), (6), and (7) as a first loop selecting a different transistor as the selected transistor;
9) repeating steps (3), (4), (5), (6), (7), and (8) as a second loop selecting a different transistor stack as the selected stack;
10) repeating steps (1), (2), (3), (4), (5), (6), (7), (8) and (9) as a third loop selecting a different gate as the selected gate; and
11) distributing allocated area to transistors in proportion to the total size factor ($A_{tot}$).

2. The method in claim 1 which further comprises:

g) determining whether the new circuit after sizing is better than the original circuit.

3. The method in claim 2 which further comprises:

h) substituting the original circuit for the new circuit if the new circuit is not determined in step (g) to be better than the original circuit.

4. The method in claim 1 which further comprises:

g) performing timing analysis on the original circuit; and h) finding a critical path based on the timing analysis, wherein: the selected gate is on the critical path.

5. The method in claim 4 which further comprises:

i) repeating steps (a), (b), (c), (d), (e), (f), (g), and (h) as a first loop.

6. The method in claim 4 which further comprises:

i) repeating steps (a), (b), (c), (d), (e), (f), (g), and (h) as a first loop until all gates on the critical path have been selected as the selected gate.

7. The method in claim 6 which further comprises:

j) repeating steps (a), (b), (c), (d), (e), (f), (g), (h), and (I) as a second loop until either specified constraints are met or no new window has been substituted into the original circuit since a last repetition through the second loop.

8. The method in claim 1 which further comprises:

g) sizing each of the set of alternate structures before step (d).

9. A method of manufacturing integrated circuits utilizing the method in claim 1 which further comprises:

g) generating a transistor placement file from the circuit layout;

h) creating a set of one or more lithographic masks from the transistor placement file; and i) fabricating a plurality of integrated circuits from the set of one or more lithographic masks.

10. A method of estimating size of at least a portion of a circuit comprising:

selecting a window that identifies a portion of the circuit;

assigning an equivalent inverter size factor which relates the size of an equivalent inverter in a corresponding position in an inverter chain to the size of the window;

selecting a transistor stack within the window;

assigning a stack size factor to the selected transistor stack, the stack size factor relating the size of the selected transistor stack to the size of a second equivalent inverter;

selecting a transistor of the transistor stack;

assigning a transistor size factor to the selected transistor, the transistor size factor relating the size of the selected transistor to the size of the transistor stack;

determining a total size factor based on the equivalent inverter size factor, the stack size factor, and the transistor size factor;

wherein the equivalent inverter size factor, the stack size factor, and the transistor size factor are determined using a precalibration table look-up interpolation operation and wherein measurements, which relate gate size to total circuit size, stack size to gate size, and transistor size to stack size, are stored in a precalibration table for access during the precalibration table look-up interpolation operation.

11. The method of claim 10 further comprising distributing area to transistors in the circuit in response to the total size.

12. The method of claim 10, wherein the equivalent inverter size factor, the stack size factor, and the transistor size factor are determined using a precalibration table look-up interpolation operation and wherein measurements are taken which relate gate size to total circuit size, stack size to gate size, and transistor size to stack size, the measurements stored in a precalibration table for access during the precalibration table look-up interpolation operation.

13. The method of claim 10, further comprising manufacturing a semiconductor device with the at least a portion of a circuit disposed therein.

14. A method of evaluating a circuit structure contained in a circuit layout, said method comprising:

a) selecting a gate from an original circuit structure as a selected gate;

b) constructing a window around the selected gate as an original window;

c) constructing a set of alternate structures for the original window;

d) selecting one of the set of alternate structures as a new window;

e) substituting the new window for the original window to form a new circuit structure; and f) sizing the new circuit structure by:

assigning an equivalent inverter size factor which relates size of an equivalent inverter in the same position in an inverter chain to the size of the new window;

assigning a stack size factor to a transistor stack, the stack size factor relating the size of the transistor stack to the size of an equivalent inverter;

assigning a transistor size factor to a transistor, the transistor size factor relating the size of the transistor to the size of the transistor stack; and determining a total size factor based on the equivalent inverter size factor, the stack size factor, and the transistor size factor, wherein the equivalent inverter size factor, the stack size factor, and the transistor size factor are determined using a precalibration table look-up interpolation operation and wherein measurements, which relate gate size to total circuit size, stack size to gate size, and transistor size to stack size, are stored in a precalibration table for access during the precalibration table look-up interpolation operation.

15. The method of claim 14 further comprising distributing area to transistors in the circuit based upon the total size and using the circuit layout to manufacture a semiconductor device.

* * * * *